United States Patent
Wang et al.

(10) Patent No.: US 7,003,655 B2
(45) Date of Patent: Feb. 21, 2006

(54) DETECTION CIRCUIT AND METHOD FOR CLEARING BIOS CONFIGURATION MEMORY

(75) Inventors: Jung-An Wang, Taipei Hsien (TW); Min-Chieh Su, Taipei Hsien (TW)

(73) Assignee: VIA Technologies, Inc., Taipei Hsien (TW)

(*) Notice: Subject to any disclaimer, the term of this patent is extended or adjusted under 35 U.S.C. 154(b) by 428 days.

(21) Appl. No.: 10/064,576

(22) Filed: Jul. 29, 2002

(65) Prior Publication Data
US 2003/0236928 A1    Dec. 25, 2003

(30) Foreign Application Priority Data
Jun. 21, 2002    (TW) ............................... 91113582 A

(51) Int. Cl.
*G06F 15/177* (2006.01)
(52) U.S. Cl. ........................................ 713/1; 713/100
(58) Field of Classification Search .................... 713/1, 713/2, 100
See application file for complete search history.

(56) References Cited

U.S. PATENT DOCUMENTS

| | | | | |
|---|---|---|---|---|
| 6,006,327 A | * | 12/1999 | Chang et al. .................. | 713/1 |
| 6,253,319 B1 | * | 6/2001 | Tran et al. ..................... | 713/1 |
| 6,473,856 B1 | * | 10/2002 | Goodwin et al. .............. | 713/2 |

FOREIGN PATENT DOCUMENTS

CN    1391151 A    7/2002

* cited by examiner

*Primary Examiner*—Chun Cao
(74) *Attorney, Agent, or Firm*—Jiang Chyun IP Office

(57) ABSTRACT

A BIOS configuration memory-clearing detection circuit and a method of clearing a BIOS configuration memory for computer main board uses a latching circuit to detect whether a user has set a clearing of the BIOS configuration memory. If the user has set a clearing of the BIOS configuration memory, the latching circuit sets a clearing latch signal. When the computer subsequently switches on, a ROM BIOS reads the status of the clearing latch signal. If the clearing latch signal is set, the ROM BIOS further clears the BIOS configuration memory to ensure the clearing operation is successful.

13 Claims, 3 Drawing Sheets

DETECTION CIRCUIT AND METHOD FOR CLEARING BIOS CONFIGURATION MEMORY

CROSS REFERENCE TO RELATED APPLICATIONS

This application claims the priority benefit of Taiwan application serial no. 91113582, filed Jun. 21, 2002.

BACKGROUND OF INVENTION

1. Field of the Invention

The invention relates generally to computer main boards (motherboards) and, more particularly, to a detection circuit on computer main boards for clearing BIOS configuration memory.

2. Description of the Related Art

In the present digital era, computer equipment is an essential tool for information processing. As the electronic technology progresses, the functions of the computer diversify into numerous aspects, offering the user the possibility of, for example, modifying various parameters that define the working environment configuration of the computer. Computer systems typically include a set of built-in software routines called the basic input/output system (BIOS). The BIOS is a software interface between the system hardware and the operating system software. The BIOS facilitates programmer and user interaction with the system hardware. The BIOS is commonly coded onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The user therefore can set, for example, a personal password, types and addresses of peripheral components, and power management functions. The setting of the working environment configuration is conventionally activated when, while the computer is switched on, a user presses specific keys on the keyboard. Once the setting is completed, the set data are stored in the BIOS memory of the computer main board (or the motherboard as what is referred to commonly). This setting will be used as the working environment configuration in subsequent on-switches of the computer.

The BIOS memory (e.g., a PROM chip) typically has a significantly longer access time than standard DRAM (Dynamic RAM) or SRAM (Static RAM) used for PC main memories. DRAM chips with access times of about 70 ns and SRAM chips with access times below 25 ns are common. But EPROMs and other PROM types often need up to 200 ns before the addressed data is available. This is important because extensive BIOS routines for access to floppy and hard disk drives or the graphics adapters are often located in the slower PROM. Moreover, these routines are frequently called by the operating system or application programs, which therefore slows down the program execution. To resolve this problem, the BIOS is commonly copied, or shadowed, from the slower BIOS memory into the faster RAM of main memory so that the main memory is accessed instead of the BIOS memory.

To prevent the loss of the stored working environment configuration when the power is no longer supplied to the computer, the computer main board is usually provided with a battery that serves as auxiliary power supply. The battery provides a necessary power voltage to refresh the faster-type BIOS configuration memory and prevent the loss of data stored therein. On the other hand, it is also necessary for the user to be able to clear and/or modify the setting stored in the environment configuration memory. This function is particularly needed when, for example, the default setting of the BIOS has to be reloaded in the faster-type BIOS configuration memory, or when the previously set BIOS configuration has to be cleared because the user has forgotten his/her password and the computer consequently cannot correctly switch on.

The conventional clearing circuit is usually implemented via a jumper that turns the connection of a power terminal of the faster-type BIOS configuration memory to the ground. The faster-type BIOS configuration memory is thereby provided with an electrical discharge path to clear the configuration data stored therein. However, because the time of each batch of electrical discharge generated from the faster-type BIOS configuration memory is not uniform, some batches may need a longer electrical discharge time to achieve a complete clearing. As a result, if the user sets an electrical discharge time that is insufficiently long, the memory clearing may be incomplete. Furthermore, if the incompletely cleared memory zones happen to pass through the check sum, problems may subsequently occur, such as an abnormal working environment after on-switch of the computer, abnormal on-switch of the computer, or even impossibility of switching on the computer.

SUMMARY OF INVENTION

An aspect of the invention is therefore to provide a method of clearing a BIOS configuration memory and a BIOS configuration memory-clearing detection circuit implementing the same method on a computer main board, which can detect whether a user has set a clearing of the BIOS configuration memory and, when the computer switches on, accordingly performs a further clearing of the BIOS configuration memory. The success of the clearing operation is thereby ensured.

To accomplish the above and other objectives, the invention provides a computer main board. The computer main board comprises a south bridge control chip and a BIOS configuration memory-clearing detection circuit. The BIOS configuration memory-clearing detection circuit includes a power-supply/memory-clearing selecting circuit and a latching circuit. The south bridge control chip includes a BIOS configuration memory that stores the working environment configuration of the computer. The power-supply/memory-clearing selecting circuit provides the user the function of selecting either a power-supply status or a memory-clearing status of the BIOS configuration memory. The power-supply status corresponds to a state where normal power is supplied to the BIOS configuration memory. The memory-clearing status corresponds to a state where the BIOS configuration memory is grounded. The latching circuit is respectively coupled with the power-supply/memory-clearing selecting circuit and the south bridge control chip. When the BIOS configuration memory is turned from a power-supply status to a memory-clearing status, the latching circuit sets a clearing latch signal.

According to an embodiment of the invention, the latching circuit comprises a diode and two inverting devices. The computer main board further includes a ROM BIOS that is capable of reading the status of the clearing latch signal when the computer switches on. If the clearing latch signal is set, the BIOS system further clears the BIOS configuration memory, and resets the clearing latch signal.

With the above construction, the latching circuit of the computer main board detects whether a clearing of the BIOS configuration memory has been set. If the user has set a clearing operation, the latching circuit accordingly sets a clearing latch signal. When the computer subsequently switches on, the BIOS reads the status of the clearing latch signal to determine whether a memory clearing of the BIOS configuration memory has to be further performed. Therefore, the invention provides a computer main board that can effectively eliminate the conventional problem of incomplete clearing of the working environment memory and resulting abnormal computer on-switch inconveniences.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Some specific embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
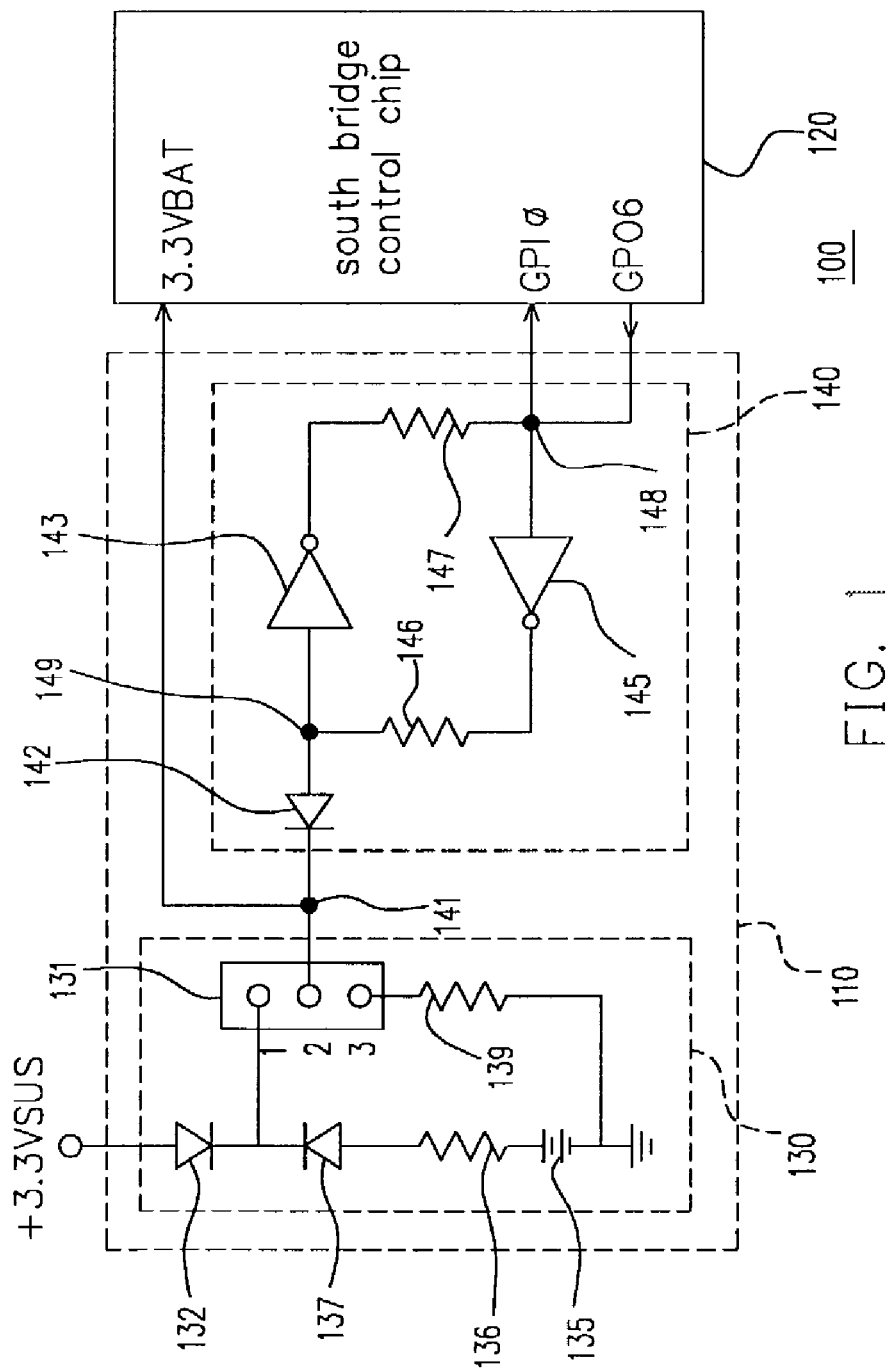
FIG. 1 is a partial circuit diagram of a computer main board according to an embodiment of the present invention.

Referring to FIG. 1, a circuit diagram schematically illustrates a portion of the circuitry of a computer main board (sometimes referred to as a motherboard) according to an embodiment of the present invention. A computer main board 100 provides the principal control functions of a computer system, and is generally associated with peripheral components to fully achieve the desired computer functions. As illustrated, the computer main board 100 comprises a datapath chipset or sometimes referred to as a south bridge control chip 120, a basic input/output system (BIOS) configuration memory-clearing detection circuit 110 and a conventional BIOS memory (typically a Read Only Memory BIOS, ROM BIOS), not shown. The south bridge control chip 120 includes the logic necessary to interface various peripheral devices to the rest of the computer system including a system chipset or sometimes referred to as a north bridge. The BIOS configuration memory-clearing detection circuit 110 includes a power-supply/memory-clearing selecting circuit 130 and a latching circuit 140. The south bridge control chip 120 further comprises a BIOS configuration memory (not shown), preferably a complementary metal oxide semiconductor (CMOS) random access memory (RAM), which stores BIOS configuration parameters necessary for a normal operation of the computer. The BIOS configuration parameters may include, for example, a personal password, types of peripheral devices and power source management function. Hereafter, CMOS RAM will refer to the BIOS configuration memory, but it will be understood that this reference is only for the sake of simpler illustration and should not be construed in a limiting manner since other types of volatile memory are also applicable.

As shown in FIG. 1, the power-supply/memory-clearing selecting circuit 130 includes a jumper 131 for providing a user with a function of selecting either a power-supply status or a memory-clearing status for the CMOS RAM. If the pins numerated 1 and 2 of the jumper 131 are connected, the power-supply status is selected. In this case, a power source (not shown) supplying a constant voltage of +3.3VSUS is provided, and is delivered through a diode 132 and the jumper 131 (with pin 1 and 2 connected) to pin 3.3VBAT of the south bridge control chip 120 to maintain a required power supply level for the CMOS RAM. If the power supply source is turned off, the normal power supply to the CMOS RAM is maintained alternatively by means of a battery 135, arranged on the computer main board 100, that is connected through a resistor 136 and another diode 137, through the jumper 131 (with pin 1 and 2 connected), to pin 3.3VBAT of the south bridge control chip 120. On the other hand, if the pins numerated 2 and 3 are connected, the memory-clearing status is selected. In this case, the pin 3.3VBAT of the south bridge control chip 120 is connected through a resistor 139 via the jumper 131 (with pin 2 and 3 connected) to the ground, thereby providing the CMOS RAM with an electrical discharge path for clearing the BIOS configuration data stored in the CMOS RAM.

As what has been mentioned in the prior art, the electrical discharge time of each batch of CMOS RAM is usually not uniform. When the electrical discharge time set by the user via connecting the pins 2 and 3 of the jumper 131 is not sufficient, an incomplete clearing may occur. To prevent this problem, the latching circuit 140 is provided to adequately configure a clearing latch signal that is input to the terminal GPI Ø of the south bridge control chip 120. The working principle of the above construction is detailed hereafter.

If the user configures the jumper 131 in a memory-clearing status with the pins 2 and 3 connected, connection node 141 is then grounded through the resistor 139. A diode 142 of the latching circuit 140 is therefore conductive (an operatively on-state) and the potential level at connection node 149 will be the same as the potential level at connection node 141 which is "0" (low potential level). Because the connection node 149 is connected to the input of an inverter 143, the output of the inverter 143 is consequently "1" (high potential level). This high potential level is delivered through a resistor 147 to a connection node 148, which sets the clearing latch signal at connection node 148 to "1". The output of another inverter 145, having its input connected to the connection node 148, is consequently "0", which is delivered through a resistor 146 back to the connection node 149. If the user subsequently reconfigures the jumper 131 to the power supply status with the pins 1 and 2 connected, because the potential level of the connection node 141 is now changed to "1", the diode 142 is therefore not conductive (an operatively off-state). The latch loop, formed by the inverters 143, 145 and the resistors 146, 147, consequently can keep the potential level at the connection node 148 equal to "1". As a result, the set status of the clearing latch signal can be kept equal to "1". It will be readily appreciated by those skilled in the art that the above construction may be replaced with other circuitry schemes having similar latch functions, provided these alternative circuitry schemes are capable of latching the status of the clearing latch signal as described above.

Figure 2:
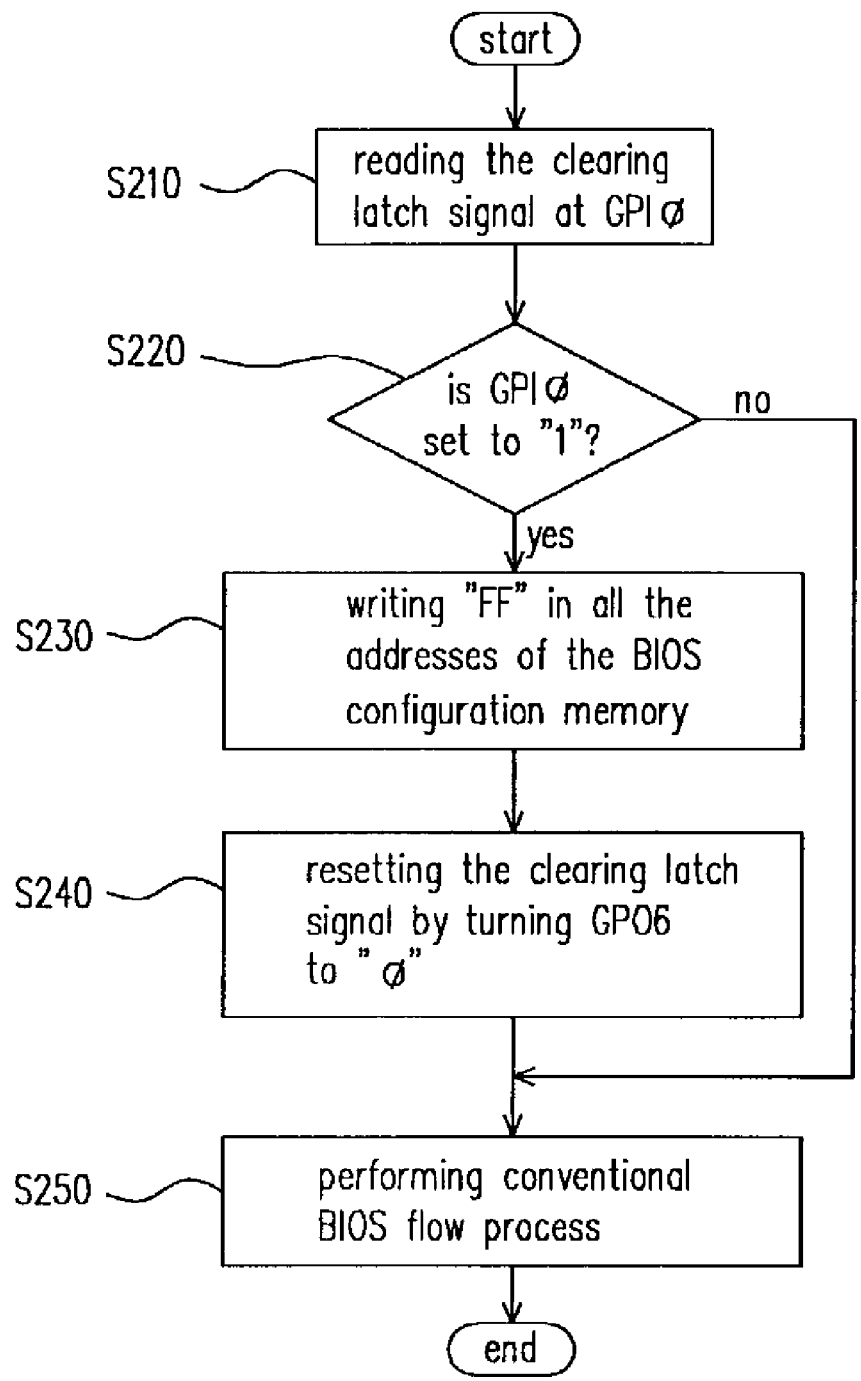
FIG. 2 is a flow chart of a BIOS configuration memory-clearing according to the embodiment of the present invention.

Referring now to FIG. 2, a flow chart schematically illustrates the process of BIOS configuration memory clearing according to the embodiment of the present invention. As illustrated, when the computer switches on, the ROM BIOS reads the status of the clearing latch signal (step S210) at connection node 148 through terminal GPI Ø of the south bridge control chip 120. Thereafter, the ROM BIOS evaluates whether the read status is "1" (step S220). If the read status is not "1", the user has not set a clearing of the CMOS RAM, and step 250 is performed to continue with remaining conventional flow process of the ROM BIOS, i.e. the BIOS instructs a CPU to perform power-on self-test (POST). If the read status is "1", the user has set a clearing of the CMOS RAM. In order to ensure the content of the CMOS RAM will be completely cleared, step S230 is executed to write a value "FF", representing the memory clearing value, in all the addresses of the CMOS RAM. Step S240 is subsequently executed to reset (turn to "0") the clearing latch signal at connection node 148 via terminal GPO6 of the south bridge control chip 120. The conventional flow process of the BIOS system is subsequently executed in step S250.

Figure 3:
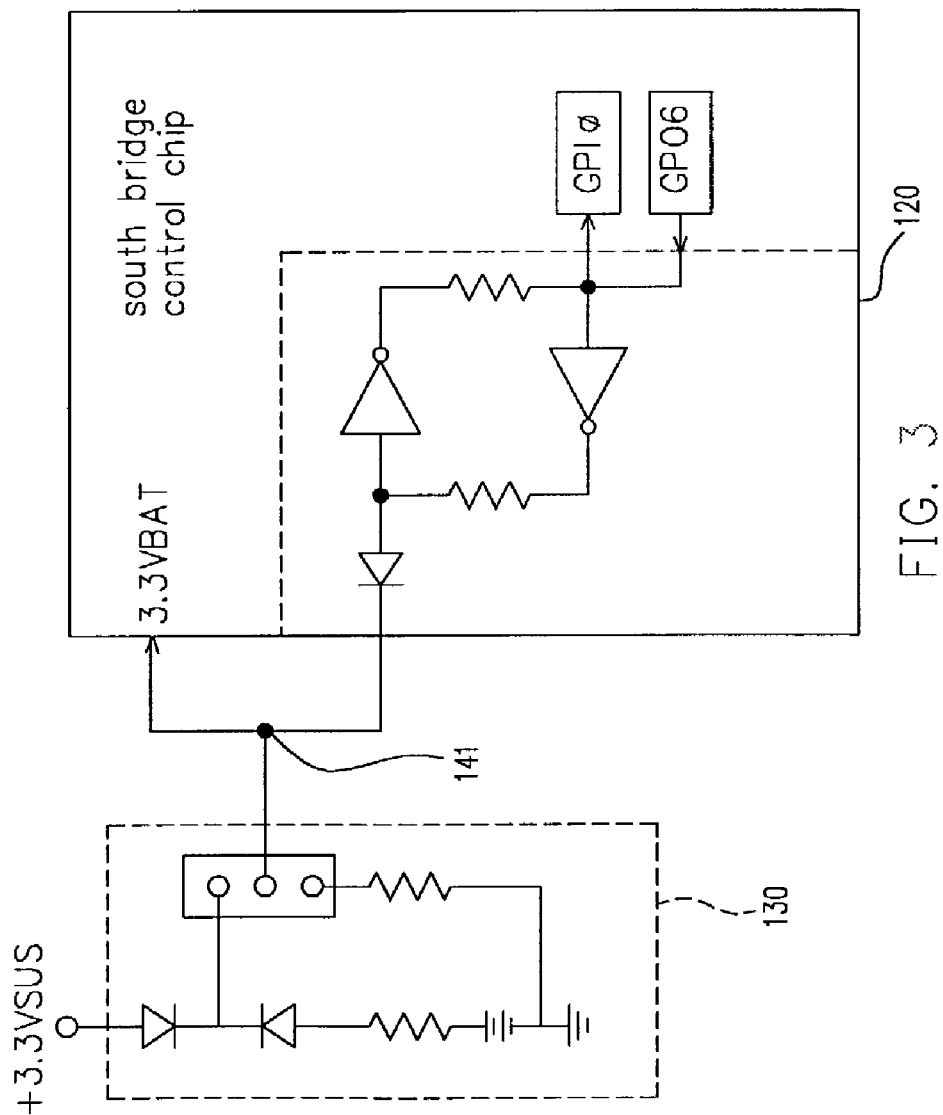
FIG. 3 is a partial circuit diagram of a computer main board according to another embodiment of the present invention.

As described above, the embodiment of the present invention therefore provides a latching circuit 140 outside the south bridge control chip 120 to detect the user's setting of a memory-clearing status, and further accordingly maintain the status of the clearing latch signal. When the computer is restarted, the ROM BIOS can thereby accordingly perform a further clearing of the CMOS RAM. The above construction is easily implemented with a relatively simple circuitry, and favorably ensures a complete clearing of the CMOS RAM without affecting the conventional functions of the computer main board. It will be readily appreciated that the latching circuit 140 can alternatively integrated in the south bridge control chip 120, as shown in FIG. 3. In this case, in addition to obtaining a complete CMOS RAM clearing, the circuit layout outside the south bridge control chip does not need any modifications, and the manufacturing process of the printed circuit board of the computer main board is therefore unchanged to achieve similar advantages.

It should be apparent to those skilled in the art that other structures that are obtained from various modifications and variations of different parts of the above-described structures of the invention would be possible without departing from the scope and spirit of the invention as illustrated herein. Therefore, the above of embodiments and examples only illustrates specific ways of making and performing the invention that, consequently, should cover variations and modifications thereof, provided they fall within the inventive concepts as defined in the following claims.

The invention claimed is:

1. A computer main board used within a computer, comprising:
   a datapath chipset, having a peripheral configuration memory for storing an effective peripheral configuration value;
   a power-supply/memory-clearing selecting circuit for switching between a power-supply status and a memory-clearing status for the peripheral configuration memory; and
   a latching circuit, electrically coupled to and in between the power-supply/memory-clearing selecting circuit and the datapath chipset for providing a clearing latch signal when the power-supply status is switched to the memory-clearing status; wherein the latching circuit comprises a diode and two inverting devices.

2. The computer main board of claim 1, wherein the datapath chipset is a south bridge.

3. The computer main board of claim 1, further comprising a basic input/output system (BIOS) that is capable of reading the clearing latch signal via the datapath chipset when the computer switches on, wherein once the clearing latch signal is set, the content of the peripheral configuration memory is cleared and the clearing latch signal is reset.

4. The computer main board of claim 1, wherein the peripheral configuration memory comprises a volatile memory.

5. The computer main board of claim 4, wherein the volatile memory is a complementary metal oxide semiconductor (CMOS) random access memory (RAM).

6. A computer main board used within a computer, comprising:
   a power-supply/memory-clearing selecting circuit for switching between a power-supply status and a memory-clearing status; and
   a datapath chipset electrically coupled to the power-supply/memory-clearing selecting circuit, the datapath chipset comprising a peripheral configuration memory for storing an effective peripheral configuration value and a latching circuit for providing a clearing latch signal when the power-supply status is switched to the memory-clearing status; wherein the latching circuit comprises a diode and two inverting devices.

7. The computer main board of claim 6, wherein the datapath chipset is a south bridge.

8. The computer main board of claim 6, further comprising a basic input/output system (BIOS) that is capable of reading the clearing latch signal of the datapath chipset when the computer switches on, wherein once the clearing latch signal is set, the content of the peripheral configuration memory is cleared and the clearing latch signal is reset.

9. The computer main board of claim 6, wherein the peripheral configuration memory comprises a volatile memory.

10. The computer main board of claim 9, wherein the volatile memory is a complementary metal oxide semiconductor (CMOS) random access memory (RAM).

11. A peripheral configuration memory-clearing detection circuit, used to detect a memory-clearing status that indicates the content of a peripheral configuration memory of a computer has to be cleared, the detection circuit comprising:
    a power-supply/memory-clearing selecting circuit for switching between a power-supply status and a memory-clearing status for the peripheral configuration memory; and
    a latching circuit, electrically coupled to the power-supply/memory-clearing selecting circuit for providing a clearing latch signal when the power-supply status is switched to the memory-clearing status; wherein the latching circuit comprises a diode and two inverting devices.

12. The detection circuit of claim 11, wherein the peripheral configuration memory comprises a volatile memory.

13. The detection circuit of claim 12, wherein the volatile memory is a complementary metal oxide semiconductor (CMOS) random access memory (RAM).

* * * * *